May 11, 1937.  H. V. WEIL  2,079,669
DEVICE FOR MAKING COMPOSITE SHOE SOLES
Filed Feb. 26, 1935   2 Sheets-Sheet 1
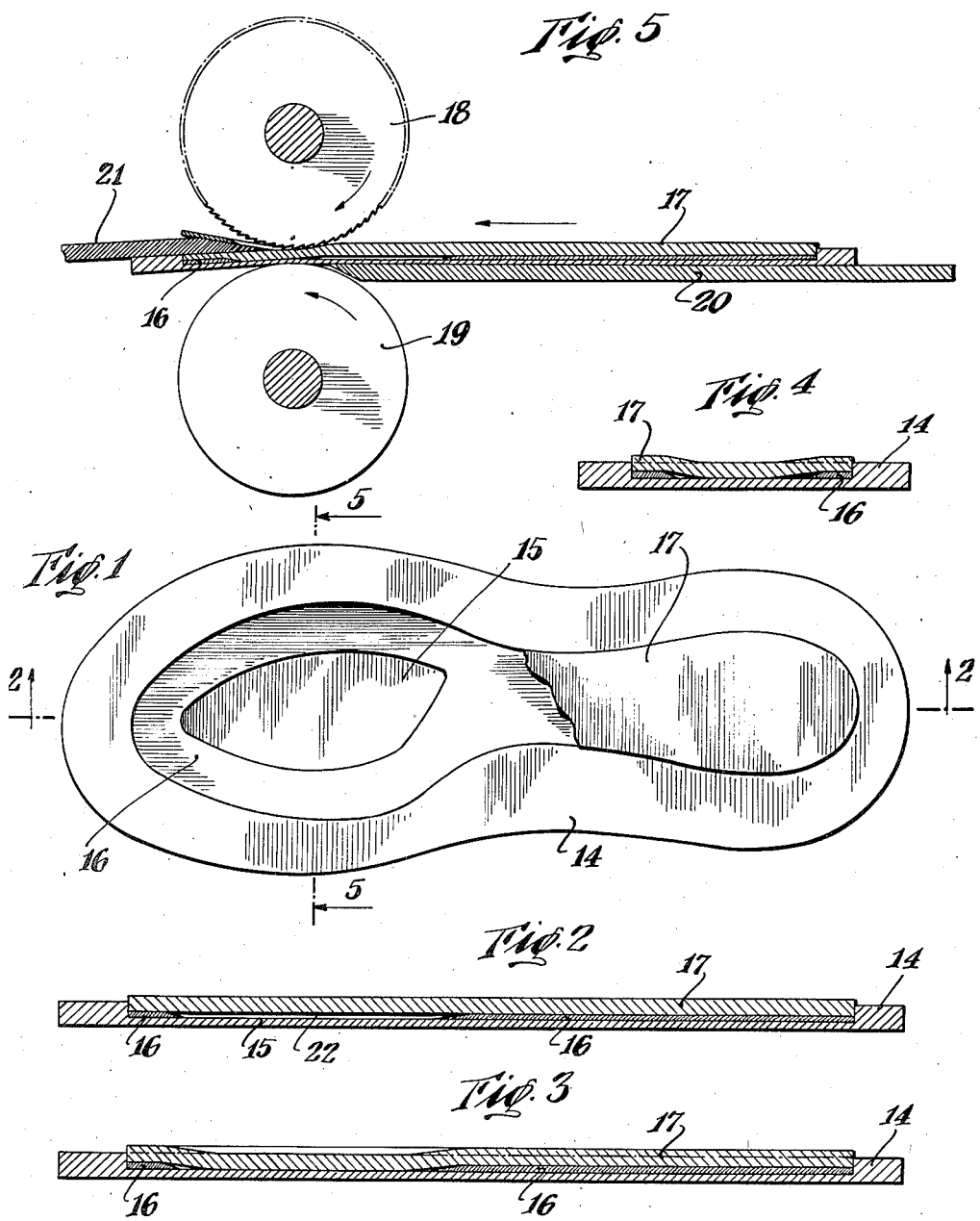
INVENTOR
Harvey V. Weil
BY
Watson, Bristol, Johnson & Leavenworth
ATTORNEYS May 11, 1937.  H. V. WEIL  2,079,669
DEVICE FOR MAKING COMPOSITE SHOE SOLES
Filed Feb. 26, 1935  2 Sheets-Sheet 2
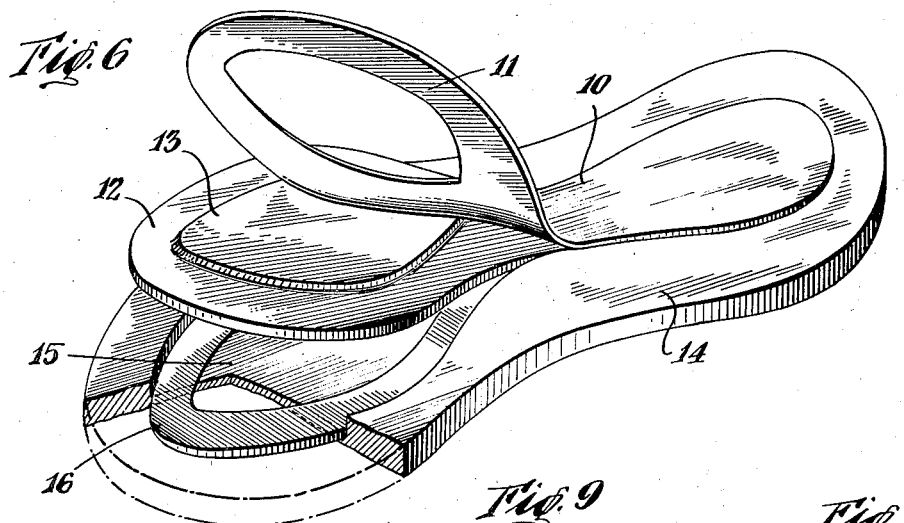
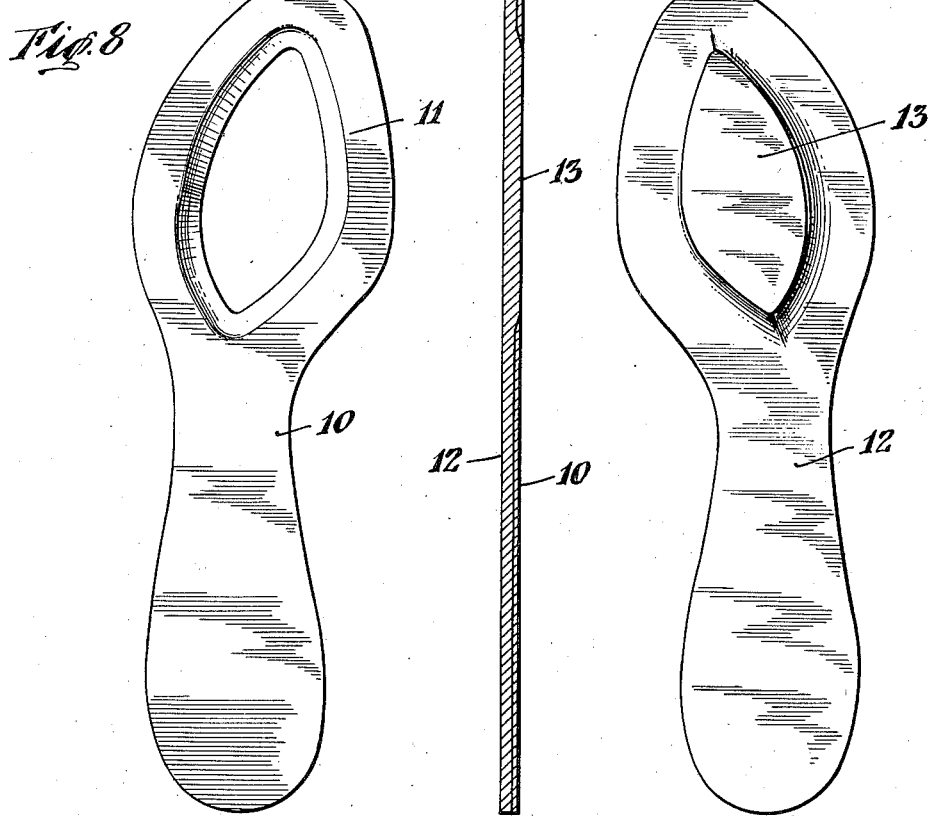
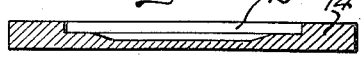
INVENTOR
Harvey V. Weil
BY
Watson, Bristol, Johnson & Leavenworth
ATTORNEYS Patented May 11, 1937

2,079,669

UNITED STATES PATENT OFFICE 2,079,669

DEVICE FOR MAKING COMPOSITE SHOE SOLES

Harvey V. Weil, Glendale, Long Island, N. Y., assignor to Compo Shoe Machinery Corporation, New York, N. Y., a corporation of Delaware Application February 26, 1935, Serial No. 8,275

5 Claims. (Cl. 12—17)

This invention relates to improvements in the manufacture of footwear, and more particularly to improvements in a device for producing composite soles for shoes from single rounded sole blanks.

A general object of the invention is to provide a device which will rapidly, economically and efficiently produce by splitting from a single rounded sole blank, a composite sole of the type wherein the insole has a randed forepart portion and the outsole a raised central forepart portion, both of which when assembled form a complementary insole-outsole unit.

Specific objects of the invention are to provide a device capable of being utilized in conjunction with any common form of leather splitting machine whenever it is desired to produce with a minimum of skill on the part of the operator such composite soles; to provide a device which will allow and control the splitting of a rounded sole blank to be performed in a single continuous operation without concern as to which portion of the blank is first to be split; to provide a matrix of flexible material firmly to hold in operative position for splitting rounded sole blanks of varying sizes; to provide a template to cooperate with such matrix to permit flexing of the sole blanks in a predetermined area definitely to control the degree of splitting and the location thereof; and, to provide a matrix which will accommodate rounded sole blanks of varying sizes and widths within a given range and still allow the splitting thereof into complementary insole-outsole units.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 1 is a top plan view of a preferred form of device embodying the principles of the present invention and illustrating the matrix having a template and sole located therein; the latter being broken away at the shank portion;

Fig. 2 is a longitudinal transverse sectional view taken along the line 2—2 of Fig. 1, carrying a rounded sole blank and showing its relative position before being passed through a splitting machine;

Fig. 3 is a view similar to Fig. 2 illustrating the relative position of the rounded sole blank being downwardly flexed as the entire assembly passes through a splitting machine;

Fig. 4 is a latitudinal transverse sectional view taken along the line 5—5 of Fig. 1 carrying a rounded sole blank and further illustrating the manner in which the central forepart portion thereof is downwardly flexed as it passes through a splitting machine;

Fig. 5 is a diagrammatic representation of the pertinent portions of a common form of leather splitting machine through which the device embodying the present invention is passed while carrying a rounded piece of sole stock to produce a composite sole;

Fig. 6 is a perspective view of the device embodying the present invention with parts broken away illustrating respectively the matrix, the template, and the former single piece of rounded sole stock separated in the forepart to illustrate a complementary insole-outsole combination after the entire assembly has been passed through a splitting machine;

Fig. 7 is a plan view of the outsole portion of a composite sole produced by passing the sole blank through the splitting machine;

Fig. 8 is a plan view of a similarly produced insole;

Fig. 9 is a cross-sectional view of a composite sole assembly comprising the insole and outsole depicted in Figs. 7 and 8;

Fig. 10 is a transverse sectional view of a modified form of the invention depicting a matrix of the type illustrated in Fig. 1, having an additionally recessed central forepart area which eliminates the use of a removable template; and Fig. 11 is a transverse vertical sectional view across the forepart portion of another form of matrix.

The composite sole or complementary insole-outsole combination is of the type covered by Sbicca Patent No. 1,902,725 which illustrates such a complementary insole-outsole unit adapted to be cut from a single piece of sole leather stock having the combined thickness of the insole and outsole formed therefrom. Generally, the present invention provides a matrix template to be used in conjunction with a leather splitting machine to produce, in a single continuous operation, such complementary insole-outsole units. The products of the present device are shown, for example, in Figs. 7 and 8. They comprise an insole 10 having a randed forepart 11 together with an outsole 12 having a raised central portion 13 in the forepart area which is complementary to and which will interfit with a centrally perforate portion in the insole 10, as is more clearly indicated in the assembly shown in Fig. 9. This assembly forms a final, single, composite sole or what has heretofore been termed a complementary insole-outsole unit.

In Fig. 1 there is shown a device embodying the present invention comprising a matrix 14 of flexible material, such as fibre or leather, preferably the latter. This matrix is recessed in the forepart, shank and heel portions as indicated at 15 so as to define the outer contour of a rounded sole blank. The matrix may itself be made from a single piece of leather or can also conveniently be made in two parts as shown in hereinafter described Fig. 11, but for convenience in illustration a matrix of a single thickness is shown in Figs. 1 to 6. Located in the recessed portion 15 there is shown a flexible template 16 preferably of leather, fiber or the like substantially similar to the insole 10 in that it has a randed forepart defining a centrally perforate opening, a shank, and a heel portion, and a sole blank although a part of the shank and heel portion of the leather are shown broken away. If desired, the template may be dispensed with by relatively deepening the depression in the forepart portion 15 of the matrix so as to conform to the general contour of the template 16 as illustrated in Fig. 10. However, the use of the template is not only more convenient but preferable.

A preferred matrix arrangement is shown in Fig. 11 where the matrix comprises a flat under section 14' having pinned thereto an upper section 14" which is rounded interiorly in the shape of an outsole to provide the sole accommodating recess 15. A template 16, which obviously has the characteristics of a completed insole ply and may in fact be such an insole is inserted in this recess. The thickness of the section 14" properly corresponds with that of the stock to be split so that the proper parts of the leather are exposed for removal in the manner hereinafter described.

In preparing a composite sole of the class described, a rounded piece of sole stock 17 is located within the matrix 14 overlying the template 16 as indicated in Fig. 2. The entire assembly is then passed through a common form of leather splitting machine of the Summit or Krag type. The pertinent portions of such a machine are diagrammatically illustrated in Fig. 5 and comprise a feed roll 18 having a corrugated surface overlying a lower rest roll 19, both rolls acting under spring pressure. At the operating portion of the machine is located a flat table 20 in order to aid the operator to feed the assembly containing the piece of rounded sole stock. The above mentioned assembly is then fed between the two rolls against a splitting knife 21. The balance of the operating structure of the splitting machine is not shown in the interest of clearness of illustration.

It will be observed that as the matrix and template carrying the rounded piece of sole stock is passed between the rolls 18 and 19 of the splitting machine the central forepart portion of the rounded sole blank immediately overlying an aperture 22 of the template 16 must necessarily be flexed downwardly, as is more clearly illustrated in Figs. 3 and 4 so that the downwardly flexed portion, being depressed, lies in a plane which is at least flush with the upper surface of the matrix 14. Thus it will be seen that the splitting knife 21, which is adjusted to graze the upper surface of the matrix 14, operates in a manner such that the entire assembly as it passes between the pressure rolls feeds only the exposed portion of the rounded sole blank against the cutting edge of the knife and only that portion is then separated from the unexposed portion in a single, continuous operation to form the complementary insole-outsole unit heretofore described. This is more clearly illustrated by reference to Fig. 6 wherein the insole 10 and outsole 12 are partly separated in the forepart areas more clearly to show how the splitting operation is perfected, although the splitting operation can be performed equally well by presenting either the heel or side portions of the assembly to the cutting edge of the knife, as more fully explained hereinafter.

With the use of such a matrix template it is not necessary to supply a similar device for each different size or width of insole and outsole required. The present device has been designed with a view to controlling the splitting of sole stock for various sizes and widths within a range of at least one and one-half sizes and a corresponding range in width. For example, the device embodying the present invention will split a piece of rounded sole stock to form an insole and outsole unit to accommodate a size 5 shoe of C width, as well as a piece of rounded sole stock to form an insole-outsole unit to accommodate a size 5 shoe of an A width. The reasons for this will at once be apparent when it is remembered that an increase or decrease in size is a matter of approximately ⅛ inch and as to width it is even less, but with respect to the shank portion of shoes within a range of size 3½ to 5 with a corresponding variation in width there is very little, if any, difference at all. Thus it is seen that the shanks for such sizes and widths remain the same.

It is therefore not necessary that the entire perimeter of a sole blank fit snugly within the matrix but only is it important that there is a snug fit in the shank portion thereof. If, therefore, the shank portion of any rounded piece of sole stock snugly fits within the corresponding portion of the matrix, it will be sufficient to allow the splitting of any size of rounded sole stock within the ranges above given.

A further feature of importance of the present invention is that the various operations can be performed with a minimum of effort and skill on the part of the operator, that is the template does not need to be carefully located beneath the rounded piece of sole leather to be split as would be necessary if no matrix were to be used. Nor does the splitting operation have to be performed by first directing the heel portion toward the knife. It will at once be obvious that with the matrix and template herein used the operator need only place the entire assembly upon the table 20, regardless of whether it is the forepart, the heel part, or either side of the sole blank which is presented to the cutting edge of the knife. All that is necessary is that the matrix and template carrying the sole blank be passed between the pressure rolls and against the edge of the knife so as to effect the splitting operation, which in any event can only occur throughout that portion of the sole blank which is not downwardly flexed, i. e. the exposed portion.

It will thus be seen that the objects above set forth are rapidly and efficiently attained and since certain changes in carrying out the above method and in the constructions set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. A matrix of flexible material having a recess in its upper surface adapted to receive and hold a flat piece of outsole leather rounded to outsole size, said matrix being adapted to be passed with such outsole leather through a splitting machine having a straight splitting knife and having a flat upper surface adapted to pass beneath such knife and a flat bottom substantially parallel with such upper surface, said recess having its shank and heel portions and the margin of its forepart portion of a depth less than the thickness of the outsole leather and the center of its forepart portion of a depth of at least the thickness of the outsole leather, and which supports said outsole leather so as to permit maximum inward flexing of the center forepart portion of the latter while exposing the remaining portion of such outsole leather to the action of said knife.

2. A matrix of flexible material having a base plate and a retaining plate secured thereto, said retaining plate adapted to receive and hold a rounded piece of outsole leather and said base plate being of a lesser thickness in its central forepart portion than in its marginal forepart portion and shank and heel areas and which when under pressure will permit the central portion of said outsole leather to be flexed inwardly until its upper surface is flush with the upper surface of said retaining plate.

3. A matrix of flexible material having a recess in its upper surface adapted to receive flat pieces of outsole leather rounded to varying outsole sizes within a given range and firmly to hold them at the shank portions, said matrix being adapted to be passed with such outsole leather through a splitting machine having a straight splitting knife and having a flat upper surface adapted to pass beneath such knife and a flat bottom substantially parallel with such upper surface, said recess being of a depth in the central forepart portion which will permit said outsole leather to be flexed inwardly until its corresponding upper surface will be flush with the upper surface of said matrix and the remaining portion of said recess being of a lesser depth to prevent the remaining portion from being equally flexed.

4. A matrix of flexible material having a base plate, a retaining plate secured thereto and being apertured to receive and hold a rounded piece of sole leather, a template having a perforate central forepart portion adapted to rest upon said base plate and conforming in outer marginal contour to said aperture, said template being of a thickness to allow said rounded sole leather to be inwardly flexed in its central forepart portion when pressure is applied thereto, and to support the remaining portions of said leather above the upper surface of said retaining plate in position for removal by the knife of a splitting machine.

5. A matrix of flexible material having a recess in its upper surface adapted to receive and hold a rounded piece of outsole leather having the combined thickness of an outsole and insole and to allow its upper surface to extend above the surface of the matrix an amount at least equal to the thickness of an insole, the bottom of said recess being so contoured that when the matrix and outsole leather are under pressure inward flexation of the central forepart portion of said outsole is permitted while maintaining the remaining portions of said outsole surfaces in exposed position for removal by the knife of a splitting machine.

HARVEY V. WEIL.